US009009819B1

(12) United States Patent
Savant

(10) Patent No.: US 9,009,819 B1
(45) Date of Patent: Apr. 14, 2015

(54) METHOD AND SYSTEM FOR DETECTING ROGUE SECURITY SOFTWARE THAT DISPLAYS FREQUENT MISLEADING WARNINGS

(75) Inventor: Anubhav Savant, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 311 days.

(21) Appl. No.: 13/010,633

(22) Filed: Jan. 20, 2011

(51) Int. Cl.
*G06F 11/00* (2006.01)
*G06F 12/14* (2006.01)
*G06F 12/16* (2006.01)
*G08B 23/00* (2006.01)
*G06F 21/57* (2013.01)

(52) U.S. Cl.
CPC ...................... *G06F 21/57* (2013.01)

(58) Field of Classification Search
CPC .................................................. H04L 63/1416
USPC ...................................................... 726/22, 24
See application file for complete search history.

(56) References Cited

U.S. PATENT DOCUMENTS

| | | | |
|---|---|---|---|
| 7,831,840 B1 * | 11/2010 | Love et al. ..................... | 713/189 |
| 8,161,554 B2 * | 4/2012 | Sadhasivam et al. .......... | 726/23 |
| 2007/0016953 A1 * | 1/2007 | Morris et al. ................... | 726/24 |
| 2007/0055642 A1 * | 3/2007 | Kim et al. ......................... | 707/1 |
| 2008/0147612 A1 * | 6/2008 | Gryaznov ........................ | 707/3 |
| 2009/0328209 A1 * | 12/2009 | Nachenberg .................... | 726/22 |
| 2010/0005291 A1 * | 1/2010 | Hulten et al. .................. | 713/156 |
| 2010/0058473 A1 | 3/2010 | Breitenbacher | |
| 2010/0095379 A1 | 4/2010 | Obrecht et al. | |

OTHER PUBLICATIONS

Martignoni et al., "A Framework for Behavior-Based Malware Analysis in the Cloud", *Lecture Notes in Computer Science*, 2009, 15 pages, vol. 5905/2009.
Preda et al., "A Semantics-Based Approach to Malware Detection", *Proceedings of the 34th ACM SIGPLAN-SIGACT Symposium on Principles of Programming Languages (POPL 2007)*, Jan. 17-19, 2007, pp. 1-12, ACM, Nice, France.
Yin et al., "Panorama: Capturing System-wide Information Flow for Malware Detection and Analysis", *14th ACM Conference on Computer and Communications Security (CCS '07)*, Oct. 29-Nov. 2, 2007, 12 pages, ACM, Alexandria, VA.

* cited by examiner

*Primary Examiner* — Andrew Nalven
*Assistant Examiner* — Khang Do
(74) *Attorney, Agent, or Firm* — Wilmer Cutler Pickering Hale and Dorr LLP

(57) ABSTRACT

A method and apparatus for detecting rogue security software whereby a timeframe and a threshold pop-up score are defined. A user computing system is monitored/scanned for any pop-up events being presented to the user and once a pop-up event is detected, the source process, or application, associated with the pop-up event is identified. The identified source process is then monitored for at least the defined timeframe and each pop-up event associated with the identified source process in the defined timeframe is counted and used to compute a pop-up score for the identified source process. The pop-up score for the identified source process is then compared with the threshold pop-up score and if the pop-up score associated with the identified source process exceeds the threshold pop-up score, the status of the identified source process is transformed to the status of identified "suspect" source process.

17 Claims, 4 Drawing Sheets

METHOD AND SYSTEM FOR DETECTING ROGUE SECURITY SOFTWARE THAT DISPLAYS FREQUENT MISLEADING WARNINGS

BACKGROUND OF THE INVENTION

Rogue security software is a form of computer malware that deceives or misleads users/victims into paying for the "fake", or simulated, removal of malware, and/or, in some cases, removal of malware intentionally introduced by the rogue security software itself. In recent years, rogue security software has become a growing and serious security threat to computing systems and communication networks and it is estimated that currently a full 15% or more of all malware is a form of rogue security software.

Herein, malware includes, but is not limited to, any software and/or code designed to infiltrate a computing system without the owner's informed and/or explicit consent.

Rogue security software typically relies on social engineering in order to defeat the security built into modern operating systems, browser software, and security systems, and install itself onto users'/victims' computing systems. Most rogue security software has a Trojan horse component which users/victims are misled into installing onto/into their computing systems. The Trojan horse may be disguised as, but is not limited to: free online malware scanning services; a browser plug-in or extension (typically toolbar); an image, screensaver, or archive file, attached to an e-mail message; a multimedia codec allegedly, or actually, required to play a certain video clip; software shared on peer-to-peer networks; and/or any other examples of the seemingly ever-evolving number of Trojan horse devices. In addition, some rogue security software is propagated onto a user/victim computing system as drive-by downloads which exploit security vulnerabilities in web browsers or e-mail clients to install themselves without any manual interaction by the user.

Once installed, the rogue security software typically generates multiple malware alerts notifying the user/victim of the fake or simulated detection of malware, pornography, or any other undesirable files, on the user's/victim's computing system and/or displays an animation simulating a fake system crash, and/or reboot of the user's/victim's computing system. In some instances, the rogue security software includes detailed malware alerts and/or message boxes that list specific files that purportedly are the malware, are infected with the malware, and/or contain the malware. In some instances, the rogue security software alerts the user/victim to performance problems or the need to perform essential housekeeping on the user's/victim's computing system. In some cases, the rogue security software will hold the user hostage by refusing to allow him or her to remove or fix the phantom problems until the "required" software is purchased and installed, and/or by the simulated system reboots and/or lockups.

As noted above, the rogue security software typically attempts to scare, or annoy, the user/victim into taking a desired action, such as paying out money to "fix" the problem, by presenting authentic-looking pop-up warnings and security alerts. These pop-up warnings and security alerts often very accurately mimic legitimate system and/or security system notices to leverage the trust of the user/victim in vendors of legitimate security software, and/or operating systems, and/or web-sites, and/or businesses.

As result of this "marketing model" used by rogue security software, e.g., to scare and/or annoy the user/victim into taking the desired action, one very common feature, or behavior, associated with rogue security software is that the pop-up warnings and security alerts are generated fairly often, i.e., at a high repetition frequency, such as multiple times per hour.

Once the rogue security software has alerted, and/or scared, the user/victim into believing their system has been infected with malware, typically via the frequently generated pop-up warnings and security alerts, the user/victim is then usually enticed to pay for malware removal services offered through the rogue security software to remove the fake, simulated, or intentionally introduced, malware. Often the user/victim is then asked to provide credit card, or other payment, information to pay for the malware removal services. In some cases, the user/victim is merely charged the stated amount for the malware removal services, and therefore only the stated amount is effectively stolen from the user/victim. In other cases, the user's/victim's payment information is used to steal lager amounts from the user/victim and/or to achieve identity theft.

Traditional methods of detecting rogue security software using legitimate security systems is a fairly time intensive and resource consuming process that is largely reactionary in nature. For instance, currently, an infected consumer of the security system first contacts the security system provider and/or provides a sample of the suspected rogue security software. Then, currently, researchers associated with the security system typically download the suspected rogue security software itself and analyze the suspected rogue security software. Currently, once the suspected rogue security software is analyzed, if it is indeed found to be rogue security software, a sample of the rogue security software, or features/code defining the rogue security software, is added to a rogue security software signature database and further instances of the rogue security software are thereby, in theory, identifiable and stoppable.

As described above, current methods for detection of rogue security software using currently available legitimate security systems is, at best, a time intensive and resource consuming reactionary process that uses samples of the rogue security software itself to identify future instances of specific rogue security software. This means that, using currently available security systems, even in a "best case", scenario, identified rogue security software is provided significant time and opportunity to infect more systems, and create more victims, before an adequate defense is created and implemented.

To actual current situation is even worse than described above because the methods used by perpetrators of rogue security software have become quite sophisticated and the perpetrators of rogue security software have become quite adept at changing the characteristic and operational parameters associated with the rogue security software, such as names, version data, and web-pages, and/or Graphical User Interfaces (GUIs), to avoid detection, or respond to detection, of the rogue security software by various legitimate security systems. Consequently, while, in the past, attackers mass-distributed a relatively small number of rogue security software versions, today they are generating and distributing millions of randomly-generated variants of rogue security software, that are often released as frequently as every few minutes, and sent to just a few targeted users at a time before the next set of variants are generated and distributed. As a result, currently, each user is potentially infected by a unique variant of rogue security software. Thus, traditional definition/signature based approaches to identifying and blocking rogue security software do not scale well to meet this challenge, nor are they particularly effective.

In addition, any text-based methods of detecting rogue security software, such as creating definitions or signatures based on the text of the generated alert and/or warning, can also be ineffective because the warnings may be generated in any language, be made to mimic actual warnings, and are also subject to multiple, and rapidly changed, variations.

As a result of the situation discussed above, rogue security software is currently a very serious threat that, thus far, has proven extremely difficult to detect and block using currently available legitimate security systems.

SUMMARY

According to one embodiment of a method and apparatus for detecting rogue security software, the behavioral characteristic associated with most rogue security software of generating malware warnings and alerts as pop-ups at a high repetition frequency to scare the user/victim into submitting their payment information is used to proactively identify potential rogue security software, as opposed to a detailed analysis and/or the use of specific definitions and/or signature data.

According to one embodiment of a method and apparatus for detecting rogue security software a timeframe is defined. In one embodiment, a threshold pop-up score is also defined. In one embodiment, the threshold pop-up score is based strictly on a count of pop-up events in the defined timeframe. In one embodiment, the threshold pop-up score is based on a count of pop-up events in the defined timeframe and/or other defined factors/data. In one embodiment, if the pop-up score associated with a non-exempt process exceeds the threshold pop-up score, then the non-exempt process is considered a "suspect" process. In one embodiment, a given user computing system is monitored/scanned for any pop-up events being presented to the user. In one embodiment, once a pop-up event is detected, the source process, or application, associated with the pop-up event is identified. In one embodiment, the identified source process is checked against a list of known safe, or "exempt", source processes and, if the source process is considered exempt, no further action is taken. In one embodiment, if the identified source process is not on the list of exempt processes, then the identified "non-exempt" source process is monitored for at least the defined timeframe. In one embodiment, each independent pop-up event associated with the non-exempt source process in the defined timeframe is counted and added to a pop-up count, and/or pop-up score, for the non-exempt source process. In one embodiment, the pop-up score for the non-exempt source process is then compared with the threshold pop-up score. In one embodiment, if the pop-up score associated with the non-exempt source process exceeds the threshold pop-up score, then the status of the non-exempt source process is transformed to the status of "suspect" source process and the now identified suspect source process is subjected to further analysis and/or corrective action.

Using the method and apparatus for detecting rogue security software discussed herein, rogue security software is identified based on behavioral characteristics, i.e., the frequent generation of pop-up events, common to many forms, types, and instances of rogue security software, as opposed to specific definitions/signatures related to specific versions/variations of rogue security software. Consequently, using the method and apparatus for detecting rogue security software discussed herein, even when, as is currently the case, millions of specific variants of rogue security software are generated and distributed as frequently as every few minutes and sent to relatively few targeted users at a time, the rogue security software can still be identified, and potentially stopped, quickly, and efficiently, based on the very "marketing model" used by rogue security software, i.e., to scare and/or annoy the user/victim into taking the desired action by frequently displaying fake pop-up alerts and/or warnings.

In addition, the method and apparatus for detecting rogue security software discussed herein is effective regardless of the text, language, and/or type of appearance, of the pop-up warning and/or alert, or any other features associated with pop-up warning/alert itself.

In addition, using the method and apparatus for detecting rogue security software discussed herein, the perpetrator cannot "defeat" the method and apparatus for detecting rogue security software discussed herein by decreasing the frequency of the pop-up warning and/or alert generated without necessarily decreasing the effectiveness of the rogue security software, i.e., without adversely affecting the ability to scare and/or annoy the user/victim into taking the desired action by less frequently displaying the fake pop-up alerts and/or warnings.

Consequently, using the method and apparatus for detecting rogue security software discussed herein, rogue security software is more reliably and quickly detected and, therefore, fewer users are likely to fall victim to these very serious and damaging scams.

Figure 1:
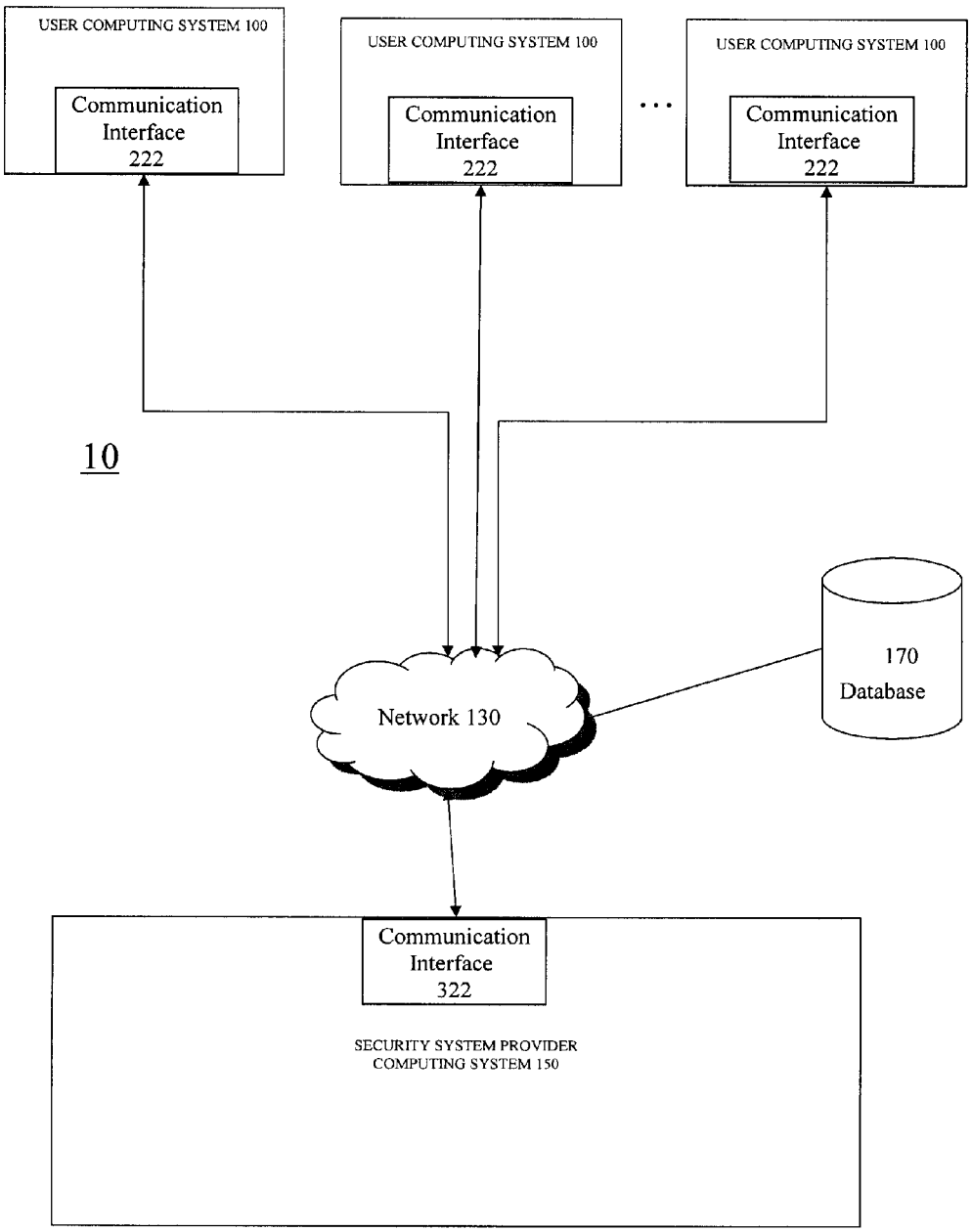
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for detecting rogue security software, a timeframe is defined.

In various embodiments the timeframe is defined and/or selected during which a source process will be monitored, as discussed below, to calculate a "pop-up score" to be associated with a source process. In various embodiments the timeframe defined and/or selected can be any timeframe desired. In various embodiments, the timeframe is selected depending on the desired level of protection and currently known operating characteristics of both "legitimate" processes and rogue security software at the time of installation and/or update. Consequently, in various embodiments, the time frame selected can be any of, but not limited to: seconds, minutes, hours, days, or any timeframe desired.

In one embodiment, a threshold pop-up score is also defined. In one embodiment, the threshold pop-up score is based strictly on a count of pop-up events in the defined timeframe, i.e., in one embodiment, the threshold pop-up score is the pop-up count for the defined timeframe. In other embodiments, the threshold pop-up score is based on a count of pop-up events in the defined timeframe and/or other defined secondary score factors/data such as, a reputation and prevalence score, and/or the presence/absence of other factors that indicate a source process is more, or less, likely, to be suspect. For instance, as a general rule, rogue security software would be expected to have a low prevalence and/or an unknown reputation since rogue security software is typically randomly generated and selectively distributed. In various embodiments, the secondary score factors/data are determined by the provider of the process for detecting rogue security software based on current data available regarding rogue security software, and/or legitimate source processes. In this way, even though the process for detecting rogue security software is largely based on behavioral characteristics of rogue security software, some definitions and/or signature type data can be incorporated as well.

As discussed in more detail below, in one embodiment, the threshold pop-up score is determined such that if the pop-up score associated with a non-exempt process is determined to exceed the threshold pop-up score, then the non-exempt process is considered a "suspect" process. In general, most legitimate processes do not automatically generate pop-ups, or pop-up windows, at a very high frequency, i.e., very often. In fact, even a few pop-ups while a user is active by a given process would be considered annoying and indicative of rogue security software. Consequently, in various embodiments, this fact is used, at least in part, to determine a threshold pop-up score to identify suspicious source processes.

As noted above, in various embodiments, the threshold pop-up score is determined based on analysis of the pop-up scores associated with both known "legitimate" processes and known rogue security software. In various embodiments the threshold pop-up score is determined based on anomaly analysis and/or anomaly detections. Anomalies are deviations from behaviors of normal, i.e., "legitimate" applications.

In various embodiments, a training environment is setup with known samples of good, i.e., "legitimate" processes, and bad, i.e., rogue security software processes, to record their behaviors and attributes, in this particular case, to determine the associated pop-up counts, and/or secondary score factors/data. In various embodiments, the recorded pop-up counts, and/or secondary score factors/data, for both legitimate and rogue security software processes is then fed into any one of various custom machine learning algorithms which, in one embodiment, analyze the information looking for certain patterns under the direction of one more processors associated with one or more computing systems. In various embodiments, the relevant behaviors and attributes, i.e., the pop-up count data, and/or secondary score factors/data, is then used to categorize pop-up scores typically associated with legitimate processes and/or pop-up scores typically associated with rogue security software. In one embodiment, this data is then used to determine a threshold pop-up score.

According to one embodiment, at least part of the process for detecting rogue security software is implemented by one or more processors associated with a user computing system and the user computing system is monitored/scanned for any pop-ups, or pop-up windows, being presented to the user at the user computing system. According to one embodiment, at least part of the process for detecting rogue security software is implemented by one or more processors associated with a security system provider computing system and the user computing system is monitored/scanned for any pop-ups, or pop-up windows, being presented to the user at the security system provider computing system.

Herein, the terms "pop-up", "pop-up window, and "pop-up display", are used interchangeably and include any graphical and/or textual display shown to a user in an effort to attract a user's attention. As used herein, the terms pop-up, or pop-up window, includes not only pop-up windows displayed on a user interface screen, i.e., in the UI foreground, but also any other form of informational window such as a tray or side bar display that is shown to a user in an effort to attract a user's attention. For instance, herein, the term pop-up, or pop-up window, includes, but is not limited to: any bubble display shown to a user in an effort to attract a user's attention; any text box shown to a user in an effort to attract a user's attention; any static graphic shown to a user in an effort to attract a user's attention; any animated graphic shown to a user in an effort to attract a user's attention; any audio element provided to a user in an effort to attract a user's attention; or any other mechanism shown to a user in an effort to attract a user's attention as discussed herein, and/or as known in the art at the time of filing, and/or as developed after the time of filing.

In one embodiment, the given user computing system is monitored/scanned for any type of pop-up, or pop-up window, including malware alerts, and/or any other system and/or application alerts and/or warnings, and/or any other type of pop-up, or pop-up window. In one embodiment, once a pop-up, or pop-up window, is detected, herein after referred to as a "pop-up event", the source process, or application, associated with the pop-up event is identified. In one embodiment, once a pop-up event is detected, the source process, or application, associated with the pop-up event is identified by one or more processors associated with one or more computing systems.

Methods, means, processes, and procedures for determining the source process of a pop-up window are known to those of skill in the art. Consequently, a more detailed discussion of specific methods, means, processes, and procedures for determining the source process of a pop-up window is omitted here to avoid detracting from the invention.

In one embodiment, the identified source process is checked against a list of known safe, or "exempt", source processes and, if the source process is considered exempt, no further action is taken. In various embodiments, the list of known safe, or exempt, source processes is generated by the provider of process for detecting rogue security software and is updated at regular intervals and/or as data is obtained. In various embodiments, the list of known safe, or exempt, source processes is generated based on user feedback. In various embodiments, the list of known safe, or exempt, source processes is generated based on analysis performed by process for detecting rogue security software. In various embodiments, the list of known safe, or exempt, source processes is obtained from any source, or combination of sources, as discussed herein, and/or as known at the time of filing, and/or as developed after the time of filing.

In addition, in one embodiment, the identified source process is checked for other defined secondary score factors/data associated with the source process, such as a reputation and prevalence score or the presence/absence of other factors that indicate the process is more, or less, likely, to be suspect.

In one embodiment, if the identified source process is not on the list of exempt processes, then the identified "non-exempt" source process is monitored for at least the defined timeframe to determine a number of pop-up events that occur in the defined timeframe that are associated with the non-exempt source process.

In one embodiment, the non-exempt source process is monitored for at least the defined timeframe, and/or the number of pop-up events that occur in the defined timeframe that are associated with the non-exempt source process is determined, by one or more processors associated with one more computing systems.

In one embodiment, each "independent pop-up event" associated with the non-exempt source process in the defined timeframe is counted and added to a pop-up count, and/or pop-up score, for the non-exempt source process. In one embodiment, an "independent pop-up event" is an instance of a pop-up occurring for a first, or a "new" time. For instance, a pop-up window that occurs and is then minimized by the user, only to be reopened by the user, is, in one embodiment, only a single "independent" pop-up event, regardless of how many times the user reopens the pop-up window. However, a pop-up window that occurs, is closed by the user, and then reoccurs, is treated as two "independent" pop-up events, and each reoccurrence of the pop-up window after the user closes the pop-up window is considered another independent pop-up event.

In one embodiment, the pop-up score for the non-exempt source process is then computed. As noted above, in various embodiments, the pop-up score for the non-exempt source process is calculated based entirely on the count of pop-up events in the defined timeframe that were associated with a non-exempt process. In other embodiments, the pop-up score for the non-exempt source process is calculated based on the count of pop-up events in the defined timeframe that were associated with the non-exempt process and/or other defined secondary score factors/data associated with the non-exempt process, such as a reputation and prevalence score or the presence/absence of other factors that indicate the process is more, or less, likely, to be suspect. As noted above, as a general rule, rogue security software would be expected to have a low prevalence and/or an unknown reputation since rogue security software is typically randomly generated and selectively distributed. As also noted above, in various embodiments, the secondary score factors/data associated with the non-exempt process are determined by the provider of the process for detecting rogue security software based on current data available regarding rogue security software. In this way, even though the process for detecting rogue security software is largely based on behavioral characteristics of rogue security software, some generalized definitions and/or signature type data can be incorporated as well.

In one embodiment, the pop-up score for the non-exempt source process is determined using one or more processors associated with one or more computing systems.

In one embodiment, the calculated/determined pop-up score for the non-exempt source process is then compared with the threshold pop-up score. In one embodiment, the calculated/determined pop-up score for the non-exempt source process is compared with the threshold pop-up score using one or more processors associated with one or more computing systems.

In one embodiment, if the pop-up score associated with the non-exempt source process exceeds the threshold pop-up score, then the status of the non-exempt source process is transformed to the status of "suspect" source process. In one embodiment, if the pop-up score associated with the non-exempt source process exceeds the threshold pop-up score, the status of the non-exempt source process is transformed to the status of "suspect" source process using one or more processors associated with one or more computing systems.

In one embodiment, the now identified suspect source process is subjected to further analysis and/or removal. In one embodiment, the pop-ups associated with the now identified suspect source process are labeled as being potentially generated by rogue security software and the user is prevented from seeing, and/or responding to, at least without a warning, the pop-ups until a more definitive analysis can be performed.

In one embodiment, once a more definitive analysis is performed, if the pop-up is deemed to be generated by rogue security software, signature data for the pop-up and/or the non-exempt source process, now identified as rogue security software, is stored in a rogue security software and/or rogue security software pop-up database and the data in the rogue security software and/or rogue security software pop-up database is used to identify future instances of the pop-up as being rogue security software pop-ups and/or to refine the threshold pop-up score and/or the associated secondary score factors/data.

As one specific and illustrative example of the operation of one embodiment of a process for detecting rogue security software, assume the timeframe is defined to be "1 hour" and the pop-up threshold score is set at "4". Further assume a pop-up event is detected on a user computing system. In this specific and illustrative example of the operation of one embodiment of a process for detecting rogue security software:

1. The source process responsible for the pop-up event on the desktop is identified;
2. The identified source process is checked against a list of "exempt" source processes and is not found to be on the list of exempt source processes;
3. Reputation and prevalence information is queried from a backend system for the identified source process;
4. Assume the identified source process is determined to have low prevalence and has an unknown reputation. As a result, the identified source process is assessed a penalty score of "1" to be added to the pop-up count of the identified source process;
5. Steps 1 through 3 are repeated for each independent pop-up event detected over the defined timeframe of an hour;
6. A pop-up count is determined for the identified source process for the defined timeframe, in this example assume the pop-up count associated with the identified source process is "4" in the defined timeframe of one hour;
7. The low prevalence and unknown reputation penalty score of "1" is added to pop-up count of "4" to yield a pop-up score of "5" for the identified source process;
8. The identified source process pop-up score of "5" is compared to the defined threshold pop-up score of "4"; and
9. Since the identified source process pop-up score of "5" is greater than the defined threshold pop-up score of "4", the identified source process is tagged as a potential or "suspect" source application and further protective action is taken.

Using the process for detecting rogue security software discussed herein, rogue security software is identified based on behavioral characteristics, i.e., the frequent generation of pop-up events, common to many forms, types, and instances of rogue security software, as opposed to specific definitions/signatures related to specific versions/variations of rogue security software. Consequently, using the process for detecting rogue security software discussed herein, even when, as is currently the case, millions of specific variants of rogue security software are generated and distributed as frequently as every few minutes, and sent to relatively few targeted users at a time, the rogue security software can still be identified, and potentially stopped, quickly, and efficiently, based on the very "marketing model" used by rogue security software, i.e., to scare and/or annoy the user/victim into taking the desired action by frequently displaying fake pop-up alerts and/or warnings.

In addition, the process for detecting rogue security software discussed herein is effective regardless of the text, language, and/or type of appearance, of the pop-up warning and/or alert, or any other features associated with pop-up warning/alert itself.

In addition, using the process for detecting rogue security software discussed herein, the perpetrator cannot "defeat" the method and apparatus for detecting rogue security software discussed herein by decreasing the frequency of the pop-up warning and/or alert generated without necessarily decreasing the effectiveness of the rogue security software, i.e., without adversely affecting the ability to scare and/or annoy the user/victim into taking the desired action by less frequently displaying the fake pop-up alerts and/or warnings.

Consequently, using the process for detecting rogue security software discussed herein, rogue security software is more reliably and quickly detected and, therefore, fewer users are likely to fall victim to these very serious and damaging scams.

Hardware

FIG. 1 shows a block diagram of an exemplary hardware system 10 suitable for implementing one embodiment of a process for detecting rogue security software, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system (s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for detecting rogue security software in accordance with at least one of the embodiments as described herein. A more detailed discussion of user computing system (s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for detecting rogue security software in accordance with at least one of the embodiments as described herein and is accessible by, controlled by, and/or otherwise associated with, a security system provider. As used herein, a security system provider includes, but is not limited to, any party, person, application, system, or entity that desires to identify and block rogue security software.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for detecting rogue security software, and/or a provider of a security system and/or a security system provider computing system 150. In one embodiment, database 170 is part of a cloud computing environment.

In one embodiment, computing system(s) 100, security system provider computing system 150, and database 170 are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170 are coupled in a cloud computing environment.

Figure 2:
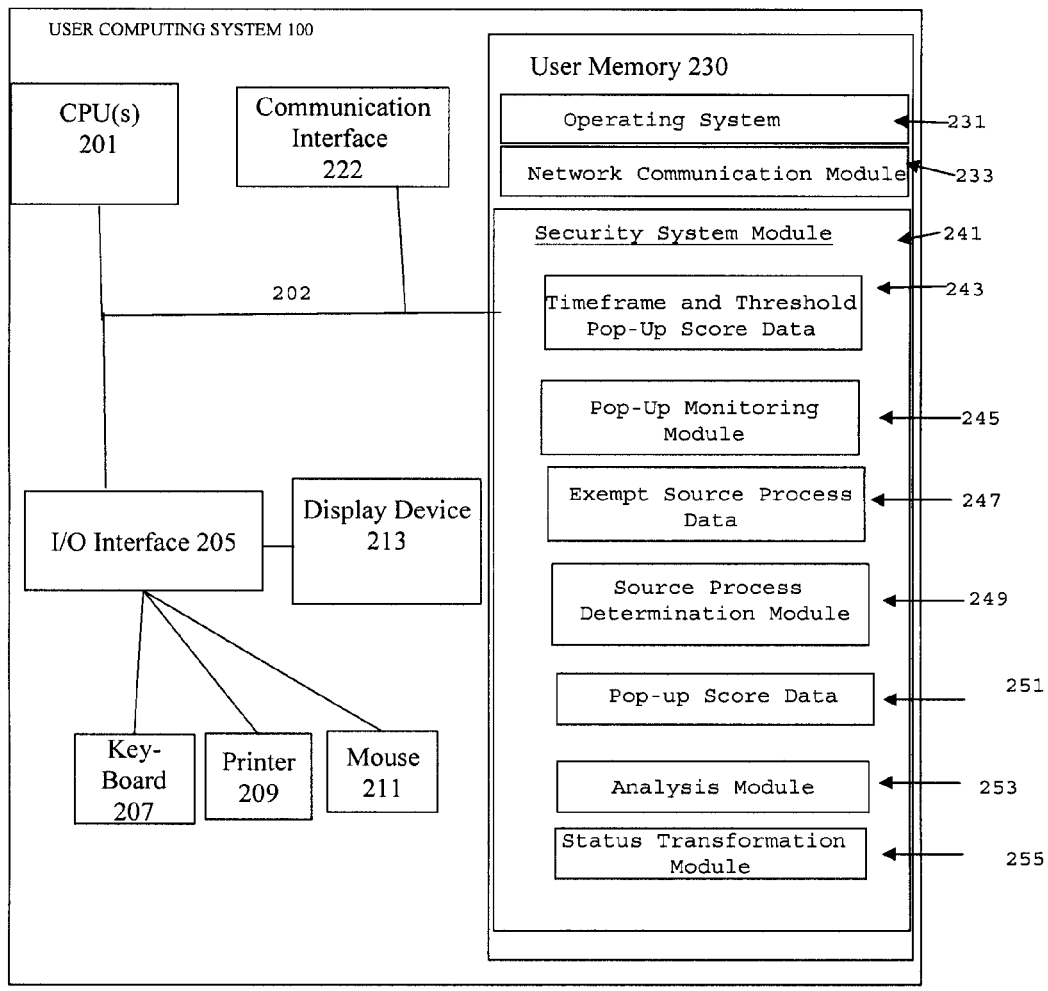
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for implementing at least part of a process for detecting rogue security software and/or identifying potential or "suspect" source processes or applications on user computing system(s) 100.

As also seen in FIG. 2, in one embodiment, security system module 241 of user memory 230 includes timeframe and threshold pop-up score data 243 that includes procedures, data, and/or instructions associated with a defined timeframe and a defined threshold pop-up score.

As also seen in FIG. 2, in one embodiment, security system module 241 of user memory 230 includes pop-up monitoring module 245 that includes procedures, data, and/or instructions, associated with monitoring and/or scanning a given user computing system, such as user computing systems 100 of FIG. 1, for any pop-up events being presented to the user.

As also seen in FIG. 2, in one embodiment, security system module 241 of user memory 230 includes exempt source process data 247 that includes procedures, data, and/or instructions, associated with a list of known safe, or "exempt", source processes that are exempt from monitoring and require no further action, and/or other defined factors/data.

As also seen in FIG. 2, in one embodiment, security system module 241 of user memory 230 includes source process determination module 249 that includes procedures, data, and/or instructions, for identifying the source process, or application, associated with detected pop-up events.

As also seen in FIG. 2, in one embodiment, security system module 241 of user memory 230 includes pop-up score data 251 that includes procedures, data, and/or instructions, associated with tracking each independent pop-up event associated with a non-exempt source process in the defined timeframe and calculating and storing a pop-up count, and/or pop-up score, for the non-exempt source process.

As also seen in FIG. 2, in one embodiment, security system module 241 of user memory 230 includes analysis module 253 that includes procedures, data, and/or instructions, for analyzing and/or comparing the pop-up score data for a non-exempt source process of pop-up score data 251 with the threshold pop-up score data of timeframe and threshold pop-up score data 243.

As also seen in FIG. 2, in one embodiment, security system module 241 of user memory 230 includes status transformation module 255 that includes procedures, data, and/or instructions, for transforming the status of a non-exempt source process whose pop-up score data 251 is determined to be greater than the threshold pop-up score data of timeframe and threshold pop-up score data 243 at analysis module 253 to a status of "suspect" source process.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
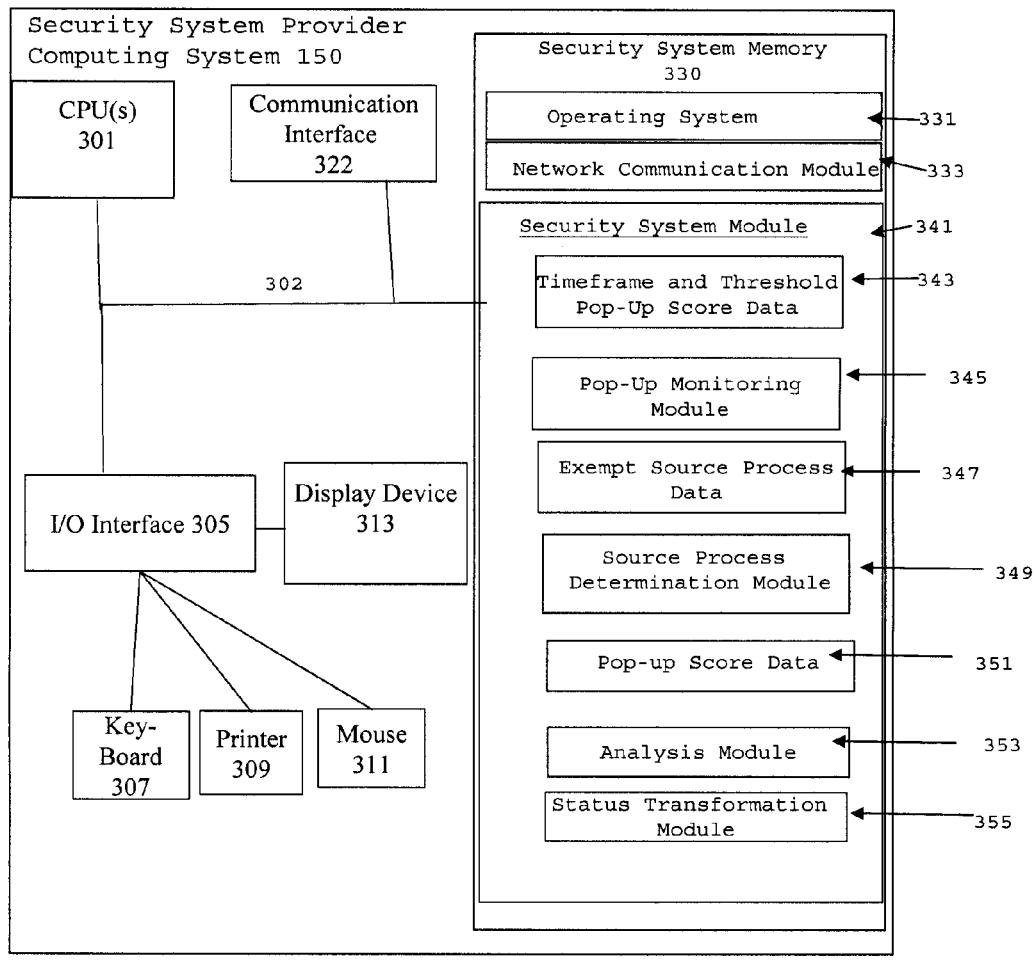
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and security system module 341 (FIG. 3) that includes procedures, data, and/or instructions, for implementing at least part of a process for detecting rogue security software and/or identifying potential or "suspect" source processes or applications on user computing system(s) 100.

As also seen in FIG. 3, in one embodiment, security system module 341 of user memory 330 includes timeframe and threshold pop-up score data 343 that includes procedures, data, and/or instructions associated with a defined timeframe and a defined threshold pop-up score.

As also seen in FIG. 3, in one embodiment, security system module 341 of user memory 330 includes pop-up monitoring module 345 that includes procedures, data, and/or instructions, associated with monitoring and/or scanning a given user computing system, such as user computing systems 100 of FIG. 1, for any pop-up events being presented to the user.

As also seen in FIG. 3, in one embodiment, security system module 341 of user memory 330 includes exempt source process data 347 that includes procedures, data, and/or instructions, associated with a list of known safe, or "exempt", source processes that are exempt from monitoring and require no further action and/or other defined factors/data.

As also seen in FIG. 3, in one embodiment, security system module 341 of user memory 330 includes source process determination module 349 that includes procedures, data, and/or instructions, for identifying the source process, or application, associated with detected pop-up events.

As also seen in FIG. 3, in one embodiment, security system module 341 of user memory 330 includes pop-up score data 351 that includes procedures, data, and/or instructions, associated with tracking each independent pop-up event associated with a non-exempt source process in the defined timeframe and calculating and storing a pop-up count, and/or pop-up score, for the non-exempt source process.

As also seen in FIG. 3, in one embodiment, security system module 341 of user memory 330 includes analysis module 353 that includes procedures, data, and/or instructions, for analyzing and/or comparing the pop-up score data for a non-exempt source process of pop-up score data 351 with the threshold pop-up score data of timeframe and threshold pop-up score data 243.

As also seen in FIG. 3, in one embodiment, security system module 341 of user memory 330 includes status transformation module 355 that includes procedures, data, and/or instructions, for transforming the status of a non-exempt source process whose pop-up score data 351 is determined to be greater than the threshold pop-up score data of timeframe and threshold pop-up score data 343 at analysis module 353 to a status of "suspect" source process.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Process

According to one embodiment of a process for detecting rogue security software, the behavioral characteristic associated with most rogue security software of generating malware warnings and alerts as pop-ups at a high repetition frequency to scare the user/victim into submitting their payment information is used to proactively identify potential rogue security software, as opposed to a detailed analysis and/or the use of specific definitions and/or signature data.

According to one embodiment of a process for detecting rogue security software a timeframe is defined. In one embodiment, a threshold pop-up score is also defined. In one embodiment, the threshold pop-up score is based strictly on a count of pop-up events in the defined timeframe. In one embodiment, the threshold pop-up score is based on a count of pop-up events in the defined timeframe and/or other defined factors/data. In one embodiment, if the pop-up score associated with a non-exempt process exceeds the threshold pop-up score, then the non-exempt process is considered a "suspect" process. In one embodiment, a given user computing system is monitored/scanned for any pop-up events being presented to the user. In one embodiment, once a pop-up event is detected, the source process, or application, associated with the pop-up event is identified. In one embodiment, the identified source process is checked against a list of known safe, or "exempt", source processes and, if the source process is considered exempt, no further action is taken. In one embodiment, if the identified source process is not on the list of exempt processes, then the identified "non-exempt" source process is monitored for at least the defined timeframe. In one embodiment, each independent pop-up event associated with the non-exempt source process in the defined timeframe is counted and added to a pop-up count, and/or pop-up score, for the non-exempt source process. In one embodiment, the pop-up score for the non-exempt source process is then compared with the threshold pop-up score. In one embodiment, if the pop-up score associated with the non-exempt source process exceeds the threshold pop-up score, then the status of the non-exempt source process is transformed to the status of "suspect" source process and the now identified suspect source process is subjected to further analysis and/or corrective action.

Figure 4:
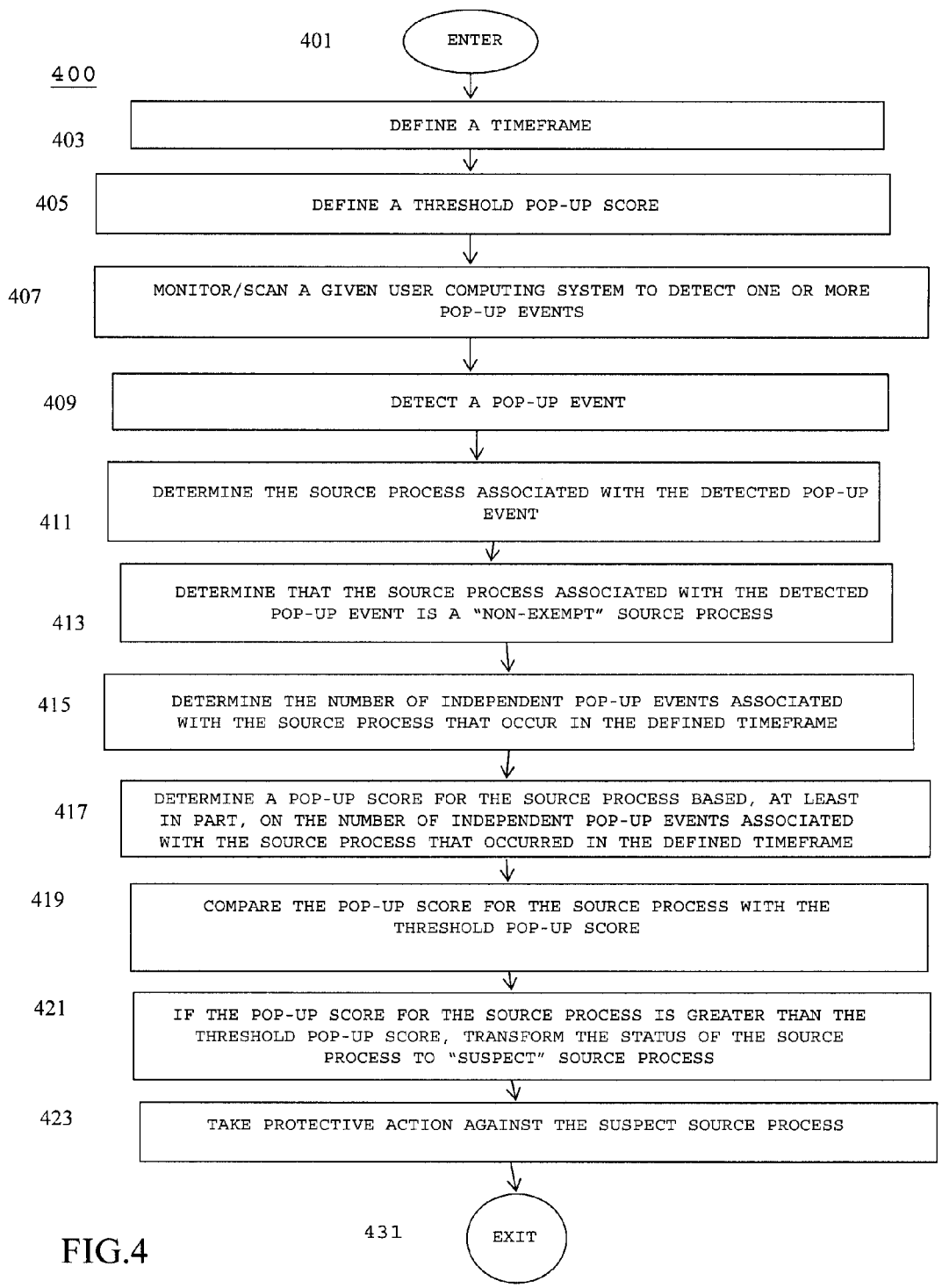
FIG. 4 is a flow chart depicting a process for detecting rogue security software in accordance with one embodiment.

FIG. 4 is a flow chart depicting a process for detecting rogue security software 400 in accordance with one embodiment.

Process for detecting rogue security software 400 begins at ENTER OPERATION 401 and process flow proceeds to DEFINE A TIMEFRAME OPERATION 403.

In one embodiment, at DEFINE A TIMEFRAME OPERATION 403 a timeframe is defined.

In various embodiments, at DEFINE A TIMEFRAME OPERATION 403 the timeframe is defined and/or selected during which a source process will be monitored, as discussed below, to calculate a "pop-up score" to be associated with a source process. In various embodiments the timeframe defined and/or selected can be any timeframe desired. In various embodiments, the timeframe is selected depending on the desired level of protection and currently known operating characteristics of both "legitimate" processes and rogue security software at the time of installation and/or update. Consequently, in various embodiments, the time frame selected can be any of, but not limited to seconds, minutes, hours, days, or any timeframe desired.

In one embodiment, once a timeframe is defined at DEFINE A TIMEFRAME OPERATION 403 process flow proceeds to DEFINE A THRESHOLD POP-UP SCORE OPERATION 405.

In one embodiment, at DEFINE A THRESHOLD POP-UP SCORE OPERATION 405 a threshold pop-up score is defined.

In one embodiment, at DEFINE A THRESHOLD POP-UP SCORE OPERATION 405 the threshold pop-up score is based strictly on a count of pop-up events in the defined timeframe, i.e., in one embodiment, the threshold pop-up score is the pop-up count for the defined timeframe.

In other embodiments, at DEFINE A THRESHOLD POP-UP SCORE OPERATION 405 the threshold pop-up score is based on a count of pop-up events in the defined timeframe and/or other defined secondary score factors/data such as, a reputation and prevalence score, and/or the presence/absence of other factors that indicate a source process is more, or less, likely, to be suspect. For instance, as a general rule, rogue security software would be expected to have a low prevalence and/or an unknown reputation since rogue security software is typically randomly generated and selectively distributed.

In various embodiments, the secondary score factors/data are determined by the provider of process for detecting rogue security software 400 based on current data available regarding rogue security software, and/or legitimate source processes. In this way, even though process for detecting rogue security software 400 is largely based on behavioral characteristics of rogue security software, some definitions and/or signature type data can be incorporated as well.

As discussed in more detail below, in one embodiment, at DEFINE A THRESHOLD POP-UP SCORE OPERATION 405 the threshold pop-up score is determined such that if the pop-up score associated with a non-exempt process is determined to exceed the threshold pop-up score, then the non-exempt process is considered a "suspect" process.

In general, most legitimate processes do not automatically generate pop-ups, or pop-up windows, at a very high frequency, i.e., very often. In fact, even a few pop-ups while a user is active by a given process would be considered annoying and indicative of rogue security software. Consequently, in various embodiments, at DEFINE A THRESHOLD POP-UP SCORE OPERATION 405 this fact is used, at least in part, to determine a threshold pop-up score to identify suspicious source processes.

As noted above, in various embodiments, at DEFINE A THRESHOLD POP-UP SCORE OPERATION 405 the threshold pop-up score is determined based on analysis of the pop-up scores associated with both known "legitimate" processes and known rogue security software. In various embodiments the threshold pop-up score is determined based on anomaly analysis and/or anomaly detections. Anomalies are deviations from behaviors of normal, i.e., "legitimate" applications.

In various embodiments, a training environment is setup with known samples of good, i.e., "legitimate" processes, and bad, i.e., rogue security software processes, to record their behaviors and attributes, in this particular case, to determine the associated pop-up counts and/or secondary score factors/data. In various embodiments, the recorded pop-up counts, and/or secondary score factors/data, for both legitimate and rogue security software processes is then fed into any one of various custom machine learning algorithms which, in one embodiment, analyze the information looking for certain patterns under the direction of one more processors associated with one or more computing systems. In various embodiments, the relevant behaviors and attributes, i.e., the pop-up count data, and/or secondary score factors/data, is then used to categorize pop-up counts, and/or secondary score factors/data, typically associated with legitimate processes and/or pop-up counts, and/or secondary score factors/data, typically associated with rogue security software. In one embodiment, this data is then used to determine a threshold pop-up score.

In one embodiment, once a threshold pop-up score is defined at DEFINE A THRESHOLD POP-UP SCORE OPERATION 405, process flow proceeds to MONITOR/SCAN A GIVEN USER COMPUTING SYSTEM TO DETECT ONE OR MORE POP-UP EVENTS OPERATION 407.

In one embodiment, at MONITOR/SCAN A GIVEN USER COMPUTING SYSTEM TO DETECT ONE OR MORE POP-UP EVENTS OPERATION 407 a user computing system is monitored/scanned for any pop-up events being presented to the user.

In one embodiment, at MONITOR/SCAN A GIVEN USER COMPUTING SYSTEM TO DETECT ONE OR MORE POP-UP EVENTS OPERATION 407 the user computing system is monitored/scanned for any pop-up events being presented to the user by one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Returning to FIG. 4, in one embodiment, at MONITOR/SCAN A GIVEN USER COMPUTING SYSTEM TO DETECT ONE OR MORE POP-UP EVENTS OPERATION 407 at least part of process for detecting rogue security software 400 is implemented by one or more processors, such as CPUs 201 of FIG. 2, associated with a user computing system, such as user computing system 100 of FIGS. 1 and 2, and the user computing system is monitored/scanned for any pop-ups, or pop-up windows, being presented to the user at the security system provider computing system using a pop-up monitoring module, such as pop-up monitoring module 245, of security system module 241, of user memory 230, of user computing system 100 of FIG. 2.

Returning to FIG. 4, in one embodiment, at MONITOR/SCAN A GIVEN USER COMPUTING SYSTEM TO DETECT ONE OR MORE POP-UP EVENTS OPERATION 407 at least part of process for detecting rogue security software 400 is implemented by one or more processors, such as CPUs 301 of FIG. 3 associated with a security system provider computing system and the user computing system is monitored/scanned for any pop-ups, or pop-up windows, being presented to the user at the security system provider computing system using an pop-up monitoring module, such as pop-up monitoring module 345, of security system module 341, of user memory 330, of security system provider computing system 150 of FIG. 3.

Herein, the terms "pop-up", "pop-up window, and "pop-up display", are used interchangeably and include any graphical and/or textual display shown to a user in an effort to attract a user's attention. As used herein, the terms pop-up, or pop-up window, includes not only pop-up windows displayed on a user interface screen, i.e., in the UI foreground, but also any other form of informational window such as a tray or side bar display that is shown to a user in an effort to attract a user's attention. For instance, herein, the term pop-up, or pop-up window, includes, but is not limited to: any bubble display shown to a user in an effort to attract a user's attention; any text box shown to a user in an effort to attract a user's attention; any static graphic shown to a user in an effort to attract a user's attention; any animated graphic shown to a user in an effort to attract a user's attention; any audio element provided to a user in an effort to attract a user's attention; or any other mechanism shown to a user in an effort to attract a user's attention as discussed herein, and/or as known in the art at the time of filing, and/or as developed after the time of filing.

Returning to FIG. 4, in one embodiment, at MONITOR/SCAN A GIVEN USER COMPUTING SYSTEM TO DETECT ONE OR MORE POP-UP EVENTS OPERATION 407 the given user computing system is monitored/scanned for any type of pop-up, or pop-up window, including malware alerts, and/or any other system and/or application alerts and/or warnings, and/or any other type of pop-up, or pop-up window.

In one embodiment, once a user computing system is monitored/scanned for any pop-up events being presented to the user at MONITOR/SCAN A GIVEN USER COMPUTING SYSTEM TO DETECT ONE OR MORE POP-UP EVENTS OPERATION 407 process flow proceeds to DETECT A POP-UP EVENT OPERATION 409.

In one embodiment, at DETECT A POP-UP EVENT OPERATION 409 a pop-up event is detected on the user computing system.

In one embodiment, at DETECT A POP-UP EVENT OPERATION 409 a pop-up event is detected on the user computing system by one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

In one embodiment, once a pop-up event is detected on the user computing system at DETECT A POP-UP EVENT OPERATION 409 process flow proceeds to DETERMINE THE SOURCE PROCESS ASSOCIATED WITH THE DETECTED POP-UP EVENT OPERATION 411.

In one embodiment, at DETERMINE THE SOURCE PROCESS ASSOCIATED WITH THE DETECTED POP-UP EVENT OPERATION 411 once a pop-up event is detected at DETECT A POP-UP EVENT OPERATION 409, the source process, or application, associated with the pop-up event is identified.

In one embodiment, at DETERMINE THE SOURCE PROCESS ASSOCIATED WITH THE DETECTED POP-UP EVENT OPERATION 411 once a pop-up, or pop-up window, is detected, herein after referred to as a "pop-up event", the source process, or application, associated with, and/or generating, the pop-up event is identified.

In one embodiment, the source process, or application, associated with the pop-up event is identified by one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Methods, means, processes, and procedures for determining the source process of a pop-up window are known to those of skill in the art. Consequently, a more detailed discussion of specific methods, means, processes, and procedures for determining the source process of a pop-up window is omitted here to avoid detracting from the invention.

Returning to FIG. 4, in one embodiment, once the source process, or application, associated with the pop-up event of DETECT A POP-UP EVENT OPERATION 409 is identified at DETERMINE THE SOURCE PROCESS ASSOCIATED WITH THE DETECTED POP-UP EVENT OPERATION 411 process flow proceeds to DETERMINE THAT THE SOURCE PROCESS ASSOCIATED WITH THE DETECTED POP-UP EVENT IS A "NON-EXEMPT" SOURCE PROCESS OPERATION 413.

In one embodiment, at DETERMINE THAT THE SOURCE PROCESS ASSOCIATED WITH THE DETECTED POP-UP EVENT IS A "NON-EXEMPT" SOURCE PROCESS OPERATION 413 the identified source process of DETERMINE THE SOURCE PROCESS ASSOCIATED WITH THE DETECTED POP-UP EVENT OPERATION 411 is checked against a list of known safe, or "exempt", source processes.

In one embodiment, at DETERMINE THAT THE SOURCE PROCESS ASSOCIATED WITH THE DETECTED POP-UP EVENT IS A "NON-EXEMPT" SOURCE PROCESS OPERATION 413 the identified source process of DETERMINE THE SOURCE PROCESS ASSOCIATED WITH THE DETECTED POP-UP EVENT OPERATION 411 is checked against a list of known safe, or "exempt", source processes using a source process determination module, such as source process determination modules 249 and 349 of FIGS. 2 and 3.

Returning to FIG. 4, in various embodiments, the list of known safe, or exempt, source processes used at DETERMINE THAT THE SOURCE PROCESS ASSOCIATED WITH THE DETECTED POP-UP EVENT IS A "NON-EXEMPT" SOURCE PROCESS OPERATION 413 is generated by the provider of process for detecting rogue security software 400 and is updated at regular intervals and/or as data is obtained.

In various embodiments, the list of known safe, or exempt, source processes used at DETERMINE THAT THE SOURCE PROCESS ASSOCIATED WITH THE DETECTED POP-UP EVENT IS A "NON-EXEMPT" SOURCE PROCESS OPERATION 413 is generated based on user feedback.

In various embodiments, the list of known safe, or exempt, source processes used at DETERMINE THAT THE SOURCE PROCESS ASSOCIATED WITH THE DETECTED POP-UP EVENT IS A "NON-EXEMPT" SOURCE PROCESS OPERATION 413 is generated based on analysis performed by process for detecting rogue security software 400.

In various embodiments, the list of known safe, or exempt, source processes used at DETERMINE THAT THE SOURCE PROCESS ASSOCIATED WITH THE DETECTED POP-UP EVENT IS A "NON-EXEMPT" SOURCE PROCESS OPERATION 413 is obtained from any source, or combination of sources, as discussed herein, and/or as known at the time of filing, and/or as developed after the time of filing.

In addition, in one embodiment, at DETERMINE THAT THE SOURCE PROCESS ASSOCIATED WITH THE DETECTED POP-UP EVENT IS A "NON-EXEMPT" SOURCE PROCESS OPERATION 413 the identified source process is checked for other defined secondary score factors/data associated with the source process, such as a reputation and prevalence score or the presence/absence of other factors that indicate the process is more, or less, likely, to be suspect.

In one embodiment, if at DETERMINE THAT THE SOURCE PROCESS ASSOCIATED WITH THE DETECTED POP-UP EVENT IS A "NON-EXEMPT" SOURCE PROCESS OPERATION 413 the identified source process of DETERMINE THE SOURCE PROCESS ASSOCIATED WITH THE DETECTED POP-UP EVENT OPERATION 411 is checked against a list of known safe, or "exempt", source processes and the source process is considered exempt, no further action is taken.

In one embodiment, if at DETERMINE THAT THE SOURCE PROCESS ASSOCIATED WITH THE DETECTED POP-UP EVENT IS A "NON-EXEMPT" SOURCE PROCESS OPERATION 413 the identified source process of DETERMINE THE SOURCE PROCESS ASSOCIATED WITH THE DETECTED POP-UP EVENT OPERATION 411 is not on the list of exempt processes, then the status of the identified source process is transformed to identified "non-exempt" source process and process flow proceeds to DETERMINE THE NUMBER OF INDEPENDENT POP-UP EVENTS ASSOCIATED WITH THE SOURCE PROCESS THAT OCCUR IN THE DEFINED TIMEFRAME OPERATION 415.

In one embodiment, at DETERMINE THE NUMBER OF INDEPENDENT POP-UP EVENTS ASSOCIATED WITH THE SOURCE PROCESS THAT OCCUR IN THE DEFINED TIMEFRAME OPERATION 415 the identified "non-exempt" source process of DETERMINE THAT THE SOURCE PROCESS ASSOCIATED WITH THE DETECTED POP-UP EVENT IS A "NON-EXEMPT" SOURCE PROCESS OPERATION 413 is monitored for at least the defined timeframe of DEFINE A TIMEFRAME OPERATION 403 to determine a number of pop-up events that occur in the defined timeframe that are associated with the non-exempt source process.

In one embodiment, at DETERMINE THE NUMBER OF INDEPENDENT POP-UP EVENTS ASSOCIATED WITH THE SOURCE PROCESS THAT OCCUR IN THE DEFINED TIMEFRAME OPERATION 415, the non-exempt source process is monitored for at least the defined timeframe, and/or the number of pop-up events that occur in the defined timeframe that are associated with the non-exempt source process is determined, by one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Returning to FIG. 4, in one embodiment, at DETERMINE THE NUMBER OF INDEPENDENT POP-UP EVENTS ASSOCIATED WITH THE SOURCE PROCESS THAT OCCUR IN THE DEFINED TIMEFRAME OPERATION 415 each "independent pop-up event" associated with the non-exempt source process in the defined timeframe is counted and added to a pop-up count, and/or pop-up score, for the non-exempt source process. In one embodiment, an "independent pop-up event" is an instance of a pop-up occurring for a first, or a "new" time.

For instance, in one embodiment, at DETERMINE THE NUMBER OF INDEPENDENT POP-UP EVENTS ASSOCIATED WITH THE SOURCE PROCESS THAT OCCUR IN THE DEFINED TIMEFRAME OPERATION 415 a pop-up window that occurs and is then minimized by the user, only to be reopened by the user, is, in one embodiment, only a single "independent" pop-up event, regardless of how many times the user reopens the pop-up window. However, a pop-up window that occurs, is closed by the user, and then reoccurs, is treated as two "independent" pop-up events, and each reoccurrence of the pop-up window after the user closes the pop-up window is considered another independent pop-up event.

In one embodiment, once the identified "non-exempt" source process of DETERMINE THAT THE SOURCE PROCESS ASSOCIATED WITH THE DETECTED POP-UP EVENT IS A "NON-EXEMPT" SOURCE PROCESS OPERATION 413 is monitored for at least the defined timeframe of DEFINE A TIMEFRAME OPERATION 403 to determine a number of pop-up events that occur in the defined timeframe that are associated with the non-exempt source process at DETERMINE THE NUMBER OF INDEPENDENT POP-UP EVENTS ASSOCIATED WITH THE SOURCE PROCESS THAT OCCUR IN THE DEFINED TIMEFRAME OPERATION 415 process flow proceeds to DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417.

In one embodiment, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 each independent pop-up event associated with the non-exempt source process in the defined timeframe of DETERMINE THE NUMBER OF INDEPENDENT POP-UP EVENTS ASSOCIATED WITH THE SOURCE PROCESS THAT OCCUR IN THE DEFINED TIMEFRAME OPERATION 415 is counted and used to compute a pop-up score for the non-exempt source process.

In one embodiment, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 the pop-up score for the non-exempt source process is determined using one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Returning to FIG. 4, as noted above, in various embodiments, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 the pop-up score for the non-exempt source process is calculated based entirely on the count of pop-up events in the defined timeframe that were associated with a non-exempt process.

In other embodiments, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 the pop-up score for the non-exempt source process is calculated based on the count of pop-up events in the defined timeframe that were associated with a non-exempt process and/or other defined secondary score factors/data associated with the non-exempt process, such as a reputation and prevalence score or the presence/absence of other factors that indicate the process is more, or less, likely, to be suspect.

As noted above, as a general rule, rogue security software would be expected to have a low prevalence and/or an unknown reputation since rogue security software is typically randomly generated and selectively distributed. As also noted above, in various embodiments, the secondary score factors/data associated with the non-exempt process are determined by the provider of process for detecting rogue security software 400 based on current data available regarding rogue security software. In this way, even though the process for detecting rogue security software is largely based on behavioral characteristics of rogue security software, some generalized definitions and/or signature type data can be incorporated as well.

In one embodiment, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 the pop-up score for the non-exempt source process is determined using one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

In one embodiment, once a pop-up score is determined for the non-exempt source process at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 data representing the pop-up score determined for the non-exempt source process is stored, in one embodiment, in a pop-up score data module, such as pop-up score data 251 and/or 351 of FIGS. 2 and 3.

In one embodiment, once each independent pop-up event associated with the non-exempt source process in the defined timeframe of DETERMINE THE NUMBER OF INDEPENDENT POP-UP EVENTS ASSOCIATED WITH THE SOURCE PROCESS THAT OCCUR IN THE DEFINED TIMEFRAME OPERATION 415 is counted and used to compute a pop-up score for the non-exempt source process at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 process flow proceeds to COMPARE THE POP-UP SCORE FOR THE SOURCE PROCESS WITH THE THRESHOLD POP-UP SCORE OPERATION 419.

In one embodiment, at COMPARE THE POP-UP SCORE FOR THE SOURCE PROCESS WITH THE THRESHOLD POP-UP SCORE OPERATION 419 the pop-up score for the non-exempt source process of DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 is compared with the threshold pop-up score of DEFINE A THRESHOLD POP-UP SCORE OPERATION 405.

In one embodiment, at COMPARE THE POP-UP SCORE FOR THE SOURCE PROCESS WITH THE THRESHOLD POP-UP SCORE OPERATION 419 the pop-up score for the non-exempt source process of DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 is compared with the threshold pop-up score of DEFINE A THRESHOLD POP-UP SCORE OPERATION 405 using one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Returning to FIG. 4, in one embodiment, at COMPARE THE POP-UP SCORE FOR THE SOURCE PROCESS WITH THE THRESHOLD POP-UP SCORE OPERATION 419 the pop-up score for the non-exempt source process of DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 is compared with the threshold pop-up score of DEFINE A THRESHOLD POP-UP SCORE OPERATION 405 using an analysis module, such as analysis module 253 and/or 353 of FIGS. 2 and 3.

Returning to FIG. 4, in one embodiment, once the pop-up score for the non-exempt source process of DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 is compared with the threshold pop-up score of DEFINE A THRESHOLD POP-UP SCORE OPERATION 405 at COMPARE THE POP-UP SCORE FOR THE SOURCE PROCESS WITH THE THRESHOLD POP-UP SCORE OPERATION 419 process flow proceeds to IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421.

In one embodiment, at IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 if the pop-up score associated with the non-exempt source process of DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 exceeds the threshold pop-up score of DEFINE A THRESHOLD POP-UP SCORE OPERATION 405, at COMPARE THE POP-UP SCORE FOR THE SOURCE PROCESS WITH THE THRESHOLD POP-UP SCORE OPERATION 419, then the status of the non-exempt source process is transformed to the status of "suspect" source process.

In one embodiment, at IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 the status of the non-exempt source process is transformed to the status of "suspect" source process using one or more processors, such as CPUs 201, 301 of FIG. 2 and FIG. 3, associated with a user computing system, such as user computing system 100 of FIGS. 1 and 2, and/or security system provider computing system 150 of FIGS. 1 and 3.

Returning to FIG. 4, in one embodiment, at IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 the status of the non-exempt source process is transformed to the status of "suspect" source process using a status transformation module, such as status transformation module 255 and/or 355 of FIGS. 2 and 3.

Returning to FIG. 4, in one embodiment, once the status of the non-exempt source process is transformed to the status of "suspect" source process at IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421, process flow proceeds to TAKE PROTECTIVE ACTION AGAINST THE SUSPECT SOURCE PROCESS OPERATION 423.

In one embodiment, at TAKE PROTECTIVE ACTION AGAINST THE SUSPECT SOURCE PROCESS OPERATION 423 the now identified suspect source process of IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 is subjected to further analysis and/or corrective action.

In one embodiment, at TAKE PROTECTIVE ACTION AGAINST THE SUSPECT SOURCE PROCESS OPERATION 423, the pop-ups associated with the now identified suspect source process are labeled as being potentially generated by rogue security software and the user is prevented from seeing, and/or responding to, at least without a warning, the pop-ups until a more definitive analysis can be performed.

In one embodiment, at TAKE PROTECTIVE ACTION AGAINST THE SUSPECT SOURCE PROCESS OPERATION 423 once a more definitive analysis is performed, if the pop-up is deemed to be generated by rogue security software, signature data for the pop-up and/or the non-exempt source process, now identified as rogue security software, is stored in a rogue security software and/or rogue security software pop-up database and the data in the rogue security software and/or rogue security software pop-up database is used to identify future instances of the pop-up as being rogue security software pop-ups and/or to refine the threshold pop-up score and/or the associated secondary score factors/data.

In one embodiment, once the now identified suspect source process of IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 is subjected to further analysis and/or corrective action at TAKE PROTECTIVE ACTION AGAINST THE SUSPECT SOURCE PROCESS OPERATION 423 process flow proceeds to EXIT OPERATION 431. In one embodiment, at EXIT OPERATION 431 process for detecting rogue security software 400 is exited to await new data.

As one specific and illustrative example of the operation of one embodiment of process for detecting rogue security software 400, assume the timeframe is defined at DEFINE A TIMEFRAME OPERATION 403 to be "1 hour" and the pop-up threshold score is set at DEFINE A THRESHOLD POP-UP SCORE OPERATION 405 as "4".

Further assume, at DETECT A POP-UP EVENT OPERATION 409, a pop-up event is detected on a user computing system being monitored at MONITOR/SCAN A GIVEN USER COMPUTING SYSTEM TO DETECT ONE OR MORE POP-UP EVENTS OPERATION 407.

In this specific and illustrative example of the operation of one embodiment of process for detecting rogue security software 400, the source process responsible for the pop-up event on the desktop is identified at DETERMINE THE SOURCE PROCESS ASSOCIATED WITH THE DETECTED POP-UP EVENT OPERATION 411.

In this specific and illustrative example of the operation of one embodiment of process for detecting rogue security software 400, at DETERMINE THAT THE SOURCE PROCESS ASSOCIATED WITH THE DETECTED POP-UP EVENT IS A "NON-EXEMPT" SOURCE PROCESS OPERATION 413 the identified source process is checked against a list of "exempt" source processes and is not found to be on the list of exempt source processes.

In this specific and illustrative example of the operation of one embodiment of process for detecting rogue security software 400, also at DETERMINE THAT THE SOURCE PROCESS ASSOCIATED WITH THE DETECTED POP-UP EVENT IS A "NON-EXEMPT" SOURCE PROCESS OPERATION 413 reputation and prevalence information is queried from a backend system for the identified source process. Further assume that the identified source process is determined to have low prevalence and has an unknown reputation. As a result, at DETERMINE THAT THE SOURCE PROCESS ASSOCIATED WITH THE DETECTED POP-UP EVENT IS A "NON-EXEMPT" SOURCE PROCESS OPERATION 413 the identified source process is assessed a penalty score of "1" to be added to the pop-up count of the identified source process.

In this specific and illustrative example of the operation of one embodiment of process for detecting rogue security software 400, at DETERMINE THE NUMBER OF INDEPENDENT POP-UP EVENTS ASSOCIATED WITH THE SOURCE PROCESS THAT OCCUR IN THE DEFINED TIMEFRAME OPERATION 415 a pop-up count is determined for the identified source process for the defined timeframe, in this example, assume the pop-up count associated with the identified source process is "4" in the defined timeframe of one hour.

In this specific and illustrative example of the operation of one embodiment of process for detecting rogue security software 400, at DETERMINE A POP-UP SCORE FOR THE SOURCE PROCESS BASED, AT LEAST IN PART, ON THE NUMBER OF INDEPENDENT POP-UP EVENTS ASSOCIATED WITH THE SOURCE PROCESS THAT OCCURRED IN THE DEFINED TIMEFRAME OPERATION 417 the low prevalence and unknown reputation penalty score of "1" is added to pop-up count of "4" to yield a pop-up score of "5" for the identified source process.

In this specific and illustrative example of the operation of one embodiment of process for detecting rogue security software 400, the identified source process pop-up score of "5" is compared to the defined threshold pop-up score of "4" at COMPARE THE POP-UP SCORE FOR THE SOURCE PROCESS WITH THE THRESHOLD POP-UP SCORE OPERATION 419.

In this specific and illustrative example of the operation of one embodiment of process for detecting rogue security software 400, since the identified source process pop-up score of "5" is greater than the defined threshold pop-up score of "4", at IF THE POP-UP SCORE FOR THE SOURCE PROCESS IS GREATER THAN THE THRESHOLD POP-UP SCORE, TRANSFORM THE STATUS OF THE SOURCE PROCESS TO "SUSPECT" SOURCE PROCESS OPERATION 421 the identified source process is tagged as a potential or "suspect" source application.

Then, in this specific and illustrative example of the operation of one embodiment of process for detecting rogue security software 400, further protective action is taken at TAKE PROTECTIVE ACTION AGAINST THE SUSPECT SOURCE PROCESS OPERATION 423.

Using process for detecting rogue security software 400, rogue security software is identified based on behavioral characteristics, i.e., the frequent generation of pop-up events, common to many forms, types, and instances of rogue security software, as opposed to specific definitions/signatures related to specific versions/variations of rogue security software. Consequently, using process for detecting rogue security software 400, even when, as is currently the case, millions of specific variants of rogue security software are generated and distributed as frequently as every few minutes, and sent to relatively few targeted users at a time, the rogue security software can still be identified, and potentially stopped, quickly, and efficiently, based on the very "marketing model" used by rogue security software, i.e., to scare and/or annoy the user/victim into taking the desired action by frequently displaying fake pop-up alerts and/or warnings.

In addition, process for detecting rogue security software 400 is effective regardless of the text, language, and/or type of appearance, of the pop-up warning and/or alert, or any other features associated with pop-up warning/alert itself.

In addition, using process for detecting rogue security software 400, the perpetrator cannot "defeat" the method and apparatus for detecting rogue security software discussed herein by decreasing the frequency of the pop-up warning and/or alert generated without necessarily decreasing the effectiveness of the rogue security software, i.e., without adversely affecting the ability to scare and/or annoy the user/victim into taking the desired action by less frequently displaying the fake pop-up alerts and/or warnings.

Consequently, using process for detecting rogue security software 400, rogue security software is more reliably and quickly detected and, therefore, fewer users are likely to fall victim to these very serious and damaging scams.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols.

Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "defining", "comparing", "transforming", "taking", "detecting", "analyzing", "storing", "saving", "classifying", "comparing", "determining", "processing", "using", "preventing", "quarantining" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for detecting rogue security software comprising:
    defining a timeframe for monitoring a source process;
    determining, using one or more processors associated with one or more computing systems, a threshold pop-up score such that a source process having a pop-up score greater than the threshold pop-up score is considered a suspect source process;
    monitoring, using the one or more processors associated with the one or more computing systems, a user computing system to detect any pop-ups generated on the user computing system;
    detecting, using the one or more processors associated with the one or more computing systems, a pop-up generated on the user computing system;
    identifying, using the one or more processors associated with the one or more computing systems, a source process associated with the detected pop-up;
    monitoring, using the one or more processors associated with the one or more computing systems, the identified source process associated with the detected pop-up for at least the defined timeframe to determine a number of pop-up events on the user computing system in the defined timeframe associated with the identified source process, wherein a pop-up event that is minimized and later reopened by a user comprises one independent pop-up event;
    determining, using the one or more processors associated with the one or more computing systems, a pop-up score for the identified source process, the pop-up score for the identified source process being based, at least in part, on the determined number of pop-up events on the user computing system in the defined timeframe associated with the identified source process, the popup score further being based on a reputation and prevalence score associated with the identified source process, the reputation and prevalence score being representative of how well-known and wide-spread the identified source process is, wherein an unknown reputation and a low prevalence score causes the pop-up score to increase;
    comparing, using the one or more processors associated with the one or more computing systems, the pop-up score for the identified source process with the threshold pop-up score; and
    if the pop-up score for the identified source process is greater than the threshold pop-up score, using the one or more processors associated with the one or more computing systems to transform a status of the identified source process to a status of identified suspect source process.

2. The computing system implemented process for detecting rogue security software of claim 1, wherein the threshold pop-up score is based on the number of pop-up events associated with a source process detected in the defined timeframe.

3. The computing system implemented process for detecting rogue security software of claim 1, wherein the threshold pop-up score is based on the number of pop-up events associated with a source process detected in the defined timeframe and one or more associated secondary factors.

4. The computing system implemented process for detecting rogue security software of claim 1, wherein the pop-up score for the identified source process is further determined based, at least in part, on the determined number of pop-up events on the user computing system in the defined timeframe associated with the identified source process and a reputation associated with the identified source process.

5. The computing system implemented process for detecting rogue security software of claim 1, further comprising:
    prior to using one or more processors associated with one or more computing systems to monitor the identified source process associated with the detected pop-up for at least the defined timeframe;
    using one or more processors associated with one or more computing systems to determine if the identified source process associated with the detected pop-up is an exempt process; and
    if the identified source process associated with the detected pop-up is an exempt process taking no further action.

6. The computing system implemented process for detecting rogue security software of claim 1, further comprising:
    if the pop-up score for the identified source process is greater than the threshold pop-up score, using one or more processors associated with one or more computing systems to transform a status of the identified source process to a status of identified suspect source process and taking one or more protective measures against the identified suspect source process.

7. A system for detecting rogue security software comprising:
    a user computing system;
    a security system provider computing system; and
    one or more processors associated with the user computing system, the one or more processors executing a process for detecting rogue security software comprising:
    defining a timeframe;
    determining a threshold pop-up score such that a source process having a pop-up score greater than the threshold pop-up score is considered a suspect source process;
    monitoring a user computing system to detect any pop-ups generated on the user computing system;
    detecting a pop-up generated on the user computing system;

identifying a source process associated with the detected pop-up;

monitoring the identified source process associated with the detected pop-up for at least the defined timeframe to determine a number of pop-up events on the user computing system in the defined timeframe associated with the identified source process;

determining a pop-up score for the identified source process, the pop-up score for the identified source process being based, at least in part, on the determined number of pop-up events on the user computing system in the defined timeframe associated with the identified source process, wherein a pop-up event that is minimized and later reopened by a user comprises one independent pop-up event, the pop-up score further being based on a reputation and prevalence score associated with the identified source process, the reputation and prevalence score being representative of how well-known and wide-spread the identified source process is, wherein an unknown reputation and a low prevalence score causes the pop-up score to increase;

using the one or more processors associated with one or more computing systems to compare the pop-up score for the identified source process with the threshold pop-up score; and if the pop-up score for the identified source process is greater than the threshold popup score, using the one or more processors associated with one or more computing systems to transform a status of the identified source process to a status of identified suspect source process.

8. The system for detecting rogue security software of claim 7, wherein the threshold pop-up score is based on the number of pop-up events associated with a source process detected in the defined timeframe.

9. The system for detecting rogue security software of claim 7, wherein the threshold pop-up score is based on the number of pop-up events associated with a source process detected in the defined timeframe and one or more associated secondary factors.

10. The system for detecting rogue security software of claim 7, wherein the pop-up score for the identified source process is further determined based, at least in part, on the determined number of pop-up events on the user computing system in the defined timeframe associated with the identified source process and a reputation associated with the identified source process.

11. The system for detecting rogue security software of claim 7, wherein the process for detecting rogue security software further comprises:

prior to using the one or more processors associated with one or more computing systems to monitor the identified source process associated with the detected pop-up for at least the defined timeframe;

using the one or more processors associated with one or more computing systems to determine if the identified source process associated with the detected pop-up is an exempt process; and if the identified source process associated with the detected pop-up is an exempt process taking no further action.

12. The system for detecting rogue security software of claim 7, wherein the process for detecting rogue security software further comprises:

if the pop-up score for the identified source process is greater than the threshold popup score, using one or more processors associated with one or more computing systems to transform a status of the identified source process to a status of identified suspect source process and taking one or more protective measures against the identified suspect source process.

13. A method for detecting rogue security software comprising:

defining a timeframe for monitoring a source process;

determining a threshold pop-up score such that a source process having a pop-up score greater than the threshold pop-up score is considered a suspect source process;

monitoring a user computing system to detect any pop-ups generated on the user computing system;

detecting a pop-up generated on the user computing system;

identifying a source process associated with the detected pop-up;

monitoring the identified source process associated with the detected pop-up for at least the defined timeframe to determine a number of pop-up events on the user computing system in the defined timeframe associated with the identified source process;

determining a pop-up score for the identified source process, the pop-up score for the identified source process being based, at least in part, on the determined number of pop-up events on the user computing system in the defined timeframe associated with the identified source process, wherein a pop-up event that is minimized and later reopened by a user comprises one independent pop-up event, the pop-up score further being based on a reputation and prevalence score associated with the identified source process, the reputation and prevalence score being representative of how well-known and wide-spread the identified source process is, wherein an unknown reputation and a low prevalence score causes the pop-up score to increase;

comparing the pop-up score for the identified source process with the threshold pop-up score; and if the pop-up score for the identified source process is greater than the threshold pop-up score, transforming a status of the identified source process to a status of identified suspect source process.

14. The method for detecting rogue security software of claim 13, wherein the threshold pop-up score is based on the number of pop-up events associated with a source process detected in the defined timeframe and one or more associated secondary factors.

15. The method for detecting rogue security software of claim 13, wherein the pop-up score for the identified source process is further determined based, at least in part, on the determined number of pop-up events on the user computing system in the defined timeframe associated with the identified source process and a reputation associated with the identified source process.

16. The method for detecting rogue security software of claim 13, wherein, prior to monitoring the identified source process associated with the detected pop-up for at least the defined timeframe, determining if the identified source process associated with the detected pop-up is an exempt process, and, if the identified source process associated with the detected pop-up is an exempt process, taking no further action.

17. The method for detecting rogue security software of claim 13, further comprising:

if the pop-up score for the identified source process is greater than the threshold pop-up score, transforming a status of the identified source process to a status of identified suspect source process and taking one or more protective measures against the identified suspect source process.

\* \* \* \* \*